United States Patent
Lee et al.

(10) Patent No.: US 9,355,243 B2
(45) Date of Patent: May 31, 2016

(54) METHOD AND SYSTEM FOR PROGRAM AUTHENTICATION

(71) Applicant: LG INNOTEK CO., LTD., Seoul (KR)

(72) Inventors: Heung Kyu Lee, Seoul (KR); Hyoung Soo Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/425,228

(22) PCT Filed: Sep. 2, 2013

(86) PCT No.: PCT/KR2013/007905
§ 371 (c)(1),
(2) Date: Mar. 2, 2015

(87) PCT Pub. No.: WO2014/035220
PCT Pub. Date: Mar. 6, 2014

(65) Prior Publication Data
US 2015/0235019 A1    Aug. 20, 2015

(30) Foreign Application Priority Data
Sep. 3, 2012   (KR) .................. 10-2012-0097055

(51) Int. Cl.
  *G06F 21/00*    (2013.01)
  *G06F 21/44*    (2013.01)
  *G06F 21/45*    (2013.01)

(52) U.S. Cl.
  CPC .............. *G06F 21/44* (2013.01); *G06F 21/45* (2013.01)

(58) Field of Classification Search
  USPC ............................................ 726/29
  See application file for complete search history.

(56) References Cited

U.S. PATENT DOCUMENTS

| | | | |
|---|---|---|---|
| 2003/0154413 A1* | 8/2003 | Shigeeda | G06F 21/31 726/3 |
| 2006/0206929 A1 | 9/2006 | Taniguchi et al. | |
| 2009/0094372 A1 | 4/2009 | Nyang et al. | |
| 2012/0144189 A1* | 6/2012 | Zhong | H04L 63/0853 713/155 |
| 2013/0081132 A1* | 3/2013 | Lee | H04L 63/0272 726/15 |

FOREIGN PATENT DOCUMENTS

| | | |
|---|---|---|
| JP | 2005-149239 A | 6/2005 |
| KR | 10-2003-0016073 A | 2/2003 |
| KR | 10-2006-0100915 A | 9/2006 |
| KR | 10-2009-0015281 A | 2/2009 |
| KR | 10-2009-0035382 A | 4/2009 |

OTHER PUBLICATIONS

Search Report for International Application No. PCT/KR2013/007905.

* cited by examiner

*Primary Examiner* — Jason Lee
(74) *Attorney, Agent, or Firm* — LRK Patent Law Firm

(57) ABSTRACT

A method and a system for authenticating a program are provided. A user system receives a program developed by a developer system and an authentication key, creates an additional authentication key by applying a preset authentication algorithm to the received program, and uses the received program if the received authentication key is matched to the additional authentication key.

4 Claims, 4 Drawing Sheets

METHOD AND SYSTEM FOR PROGRAM AUTHENTICATION

TECHNICAL FIELD

The embodiment relates to an authentication method and an authentications system between a system of a developer that develops a program and a system of a user who uses the program.

BACKGROUND ART

As functions of electronic products are diversified, software functions are also diversified to the extent of satisfying the functions of the electronic products.

Accordingly, it is almost impossible for one company or one organization to make all things related to one product, and software becomes a product bought and sold as a single component.

However, different from hardware, the software can be simply copied. Accordingly, even if there is no source code, the software may be simply copied to another system including a central processing unit (CPU) having the same instruction set for the use of the software.

Accordingly, a company to produce the software requires the mounting of a security IC into hardware employing the software so that the security IC frequently requires the authentication for the use of the software.

However, since the security IC is a component that does not relate to the function of the final product, the price of the final product may be inevitably increased.

DISCLOSURE

Technical Problem

The embodiment suggests that the authentication between a system of a developer that develops a program and a system of a user who uses the program is realized in program.

The embodiment suggests that a preset algorithm (e.g., HASH), which is used to create an authentication key, is applied to a kernel region of an operating system (OS) to substitute for a security IC to prevent an illegal copy of a software/contents, when the software/contents are used in a product, for example a Smart Box, thereby removing the security IC.

The embodiment suggests that a device driver of a kernel region to deny the user access thereto includes an algorithm to perform the authentication between a developer system of a system software and a user system of an application software The embodiment suggests that the developer system, which develops a program, creates an authentication key and transfers the authentication key to a user system, and the user system, which receives the authentication key, deciphers data using the authentication key to make effective data.

The embodiment suggests that a developer that develops a program periodically transfers encrypted authentication key information to a system to determine if a user is an authorized user, continuously executes the program if the user is the authorized user, and stops the execution of the program if the user is not the authorized user.

Technical Solution

In order to accomplish the above objects, there is provided a method for authenticating a program. The method includes receiving the program, which is developed by a developer system, and an authentication key by a user system, creating an additional authentication key by applying a preset authentication algorithm to the received program by the user system, and using the received program by the user system if the received authentication key is matched with the additional authentication key. Meanwhile, in order to accomplish the above objects, there is provided a system for authenticating a program. The system includes a developer system to develop the program and to transfer the program together with an authentication key, and a user system to receive the program and the authentication key, to create an additional authentication key by applying a preset authentication algorithm to the received program, and to use the received program if the received authentication key is matched with the additional authentication key.

Advantageous Effects

According to the embodiment, the authentication operation between a system of a developer that develops the program and the system of the user who uses the program can be realized in program, thereby reducing the cost and the size resulting from an additional device for security.

According to the embodiment the preset authentication algorithm (e.g., HASH), which is used to create an authentication key, can be applied to the kernel region of the operating system (OS) of the product to substitute for a security IC to prevent an illegal copy of a software/contents, when the software/contents are used in a Smart Box, thereby performing an authentication process in program.

According to the embodiment, the developer system, which develops the program, creates the authentication key and transfers the authentication key to the user system, and the user system, which receives the authentication key, deciphers data using the authentication key to make effective data, thereby protecting intellectual properties of the developer in program.

In addition, according to the embodiment, the developer that develops the program periodically transfers the encrypted authentication key to the user system to periodically determine if the user is the authorized user, thereby protecting the intellectual properties of the developer.

BEST MODE

Mode for Invention

Hereinafter, a method of authenticating a program according to the embodiment of the present invention will be described with reference to accompanying drawings.

Hereinafter, terminologies used in the embodiment of the present invention are selected as general terminologies which have been extensively used by those skilled in the art. In the specific case, the terminologies are newly coined by applicant, and the newly coined terminologies are described in detail in terms of operations and meanings thereof in the description, of the relevant embodiments.

Accordingly, the embodiments should be comprehended in terms of the operations/meanings represented by the terminologies beyond the names of the terminologies.

In the following description of the embodiments, when components are coupled to each other and connected with each other, and make contact with each other, the components not only are directly coupled to each other or connected with each other, or make contact with each other, but also are mechanically coupled to each other, electrically connected with each other, or connected with each other in a wireless/wired scheme through another component, another medium, or another device interposed therebetween.

Following description will be made on the assumption that an HASH algorithm, an LGIT binary, and the like are previously stored in both of a developer system and a user system.

Meanwhile, Video Codec is one example of software developed by a developer. Even if a Video Codec developer, supplies a library, the library is supplied in the form of a file which is an output. Accordingly, if the file is acquired by the outside (another developer or a cracker), problems may be caused for the Video Codec developer due to the intellectual property drain. Therefore, according to the present invention, an authentication process is mutually performed between a user and a developer in program when an authentication procedure is performed.

Figure 1:
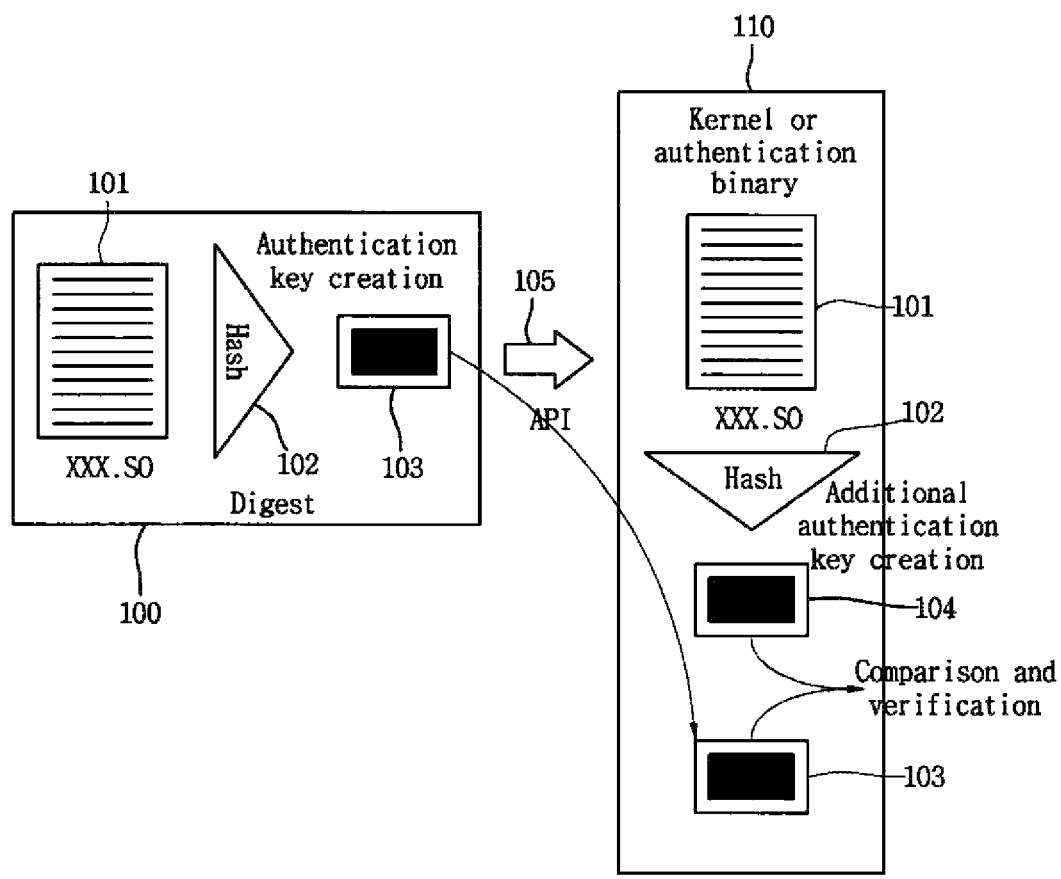
FIG. 1 is a view to explain an authentication method between a developer system and a user system according to one embodiment of the present invention.
Figure 2:
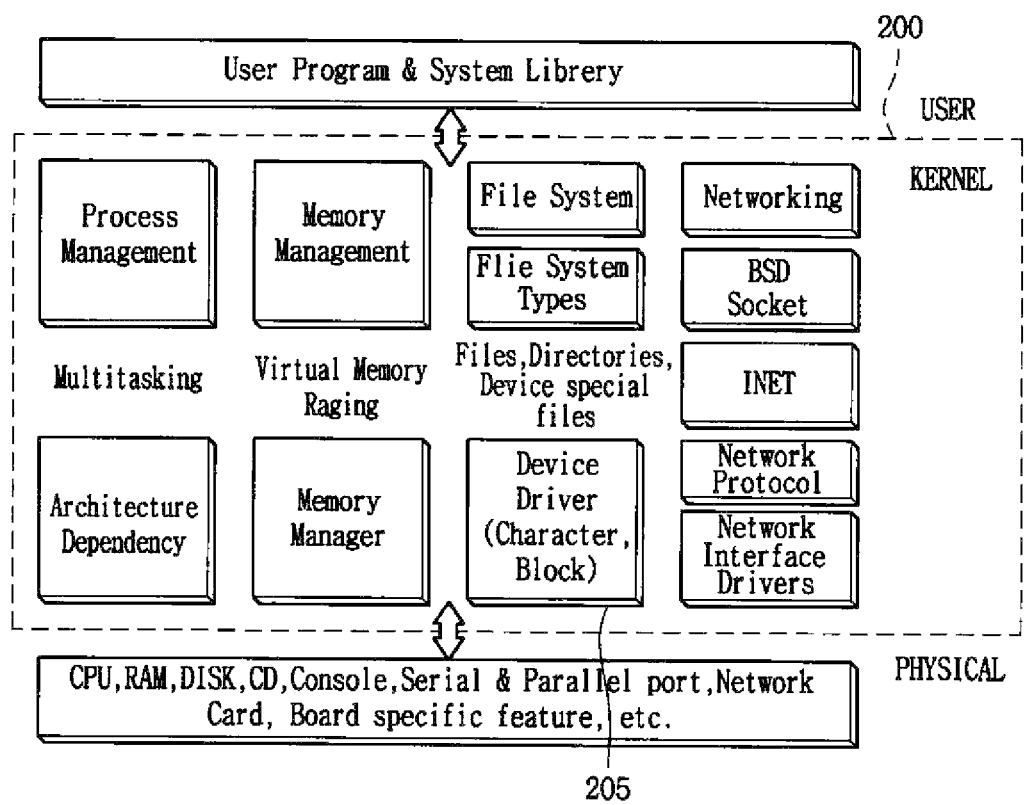
FIG. 2 is a view showing that an authentication algorithm received from the developer system is stored in a device driver of the user system.

FIG. 1 is a view to explain an authentication method between a developer system and a user system according to one embodiment of the present invention, and FIG. 2 is a view showing that an authentication algorithm received from the developer system is stored in a device driver of the user system. In this case, the developer system and the user system have settings that the developer system and the user system share a preset authentication algorithm and preset binary numbers.

Referring to FIG. 1, a developer system 100 develops a program 101. In detail, the developer system 100 develops a device driver such as a Video Codec called "xxx.so". The developer system 100 creates an authentication key 103 by applying an authentication algorithm to the program 101. In this case, the authentication algorithm 102 may include a HASH algorithm. For example, the authentication algorithm 102 may include an MD4 HASH algorithm and an MD5 HASH algorithm. In addition, the developer system 100 transfers the program 101 and the authentication key 103 to a user system 110. In detail, the developer system 100 transfers the program 101 and the authentication key 103 through a preset interface 105. For example, the interface 105 may include an application program interface (API).

Meanwhile, the user system 110 receives the program 101 and the authentication key 103 from the developer system 100. In addition, the user system 110 stores the program 101 and the authentication key 103. In this case, as shown in FIG. 2, the user system 110 may store the program 101 and the authentication key 103 in a device driver 205 of a kernel 200. In addition, the user system 110 creates an additional authentication key 104 by applying the authentication algorithm 102 to the program 101. Thereafter, the user system 110 compares the authentication key 103 received from the developer system 100 with the additional authentication key 104 created by the user system 110. If the authentication key 103 received from the developer system 100 is matched with the additional authentication key 104 created by the user system 110 according to the comparison result, the user system 110 uses the program 101.

Figure 3:
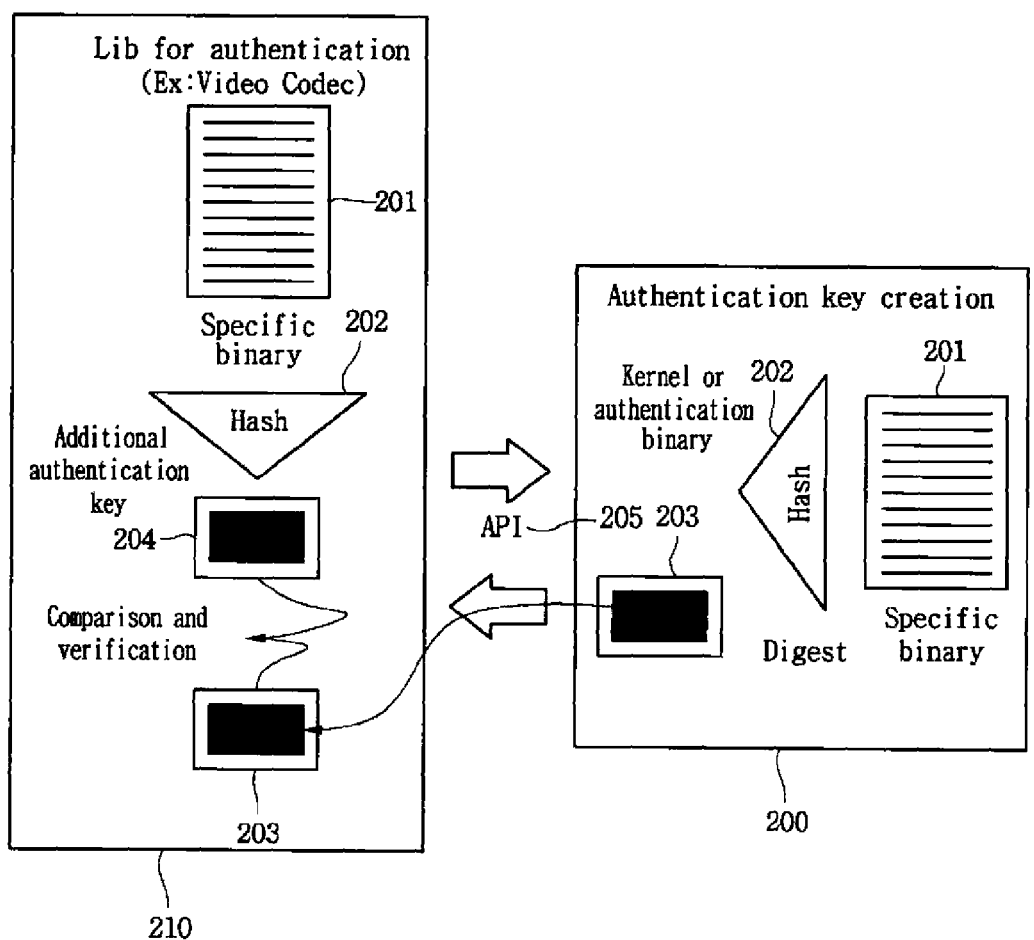
FIG. 3 is a view to explain an authentication method between a developer system and a user system according to another embodiment of the present invention.

FIG. 3 is a view to explain an authentication method between a developer system and a user system according to another embodiment of the present invention. In this case, the developer system and the user system have settings that the developer system and the user system share a preset authentication algorithm and preset binary numbers.

Referring to FIG. 3, a developer system 200 develops a program 201 using preset binary numbers. In addition, the developer system 200 creates an authentication key 203 by applying an authentication algorithm 202 to the program 201. In detail, the authentication key 203 is created by applying the binary numbers preset for the program 201 to the authentication algorithm 202. In addition, the developer system 200 transfers the program 201 and the authentication key 203 to a user system 210. In detail, the developer system 200 transfers the program 201 and the authentication key 203 through a preset interface 205. For example, the interface 205 may include an application program interface (API). Meanwhile, the user system 210 receives the program 201 and the authentication key 203 from the developer system 200. In addition, the user system 210 stores the program 201 and the authentication key 203. In addition, the user system 210 creates an additional authentication key 204 by applying the authentication algorithm 202 to the program 201. In detail, the additional authentication key 204 is created by applying the binary numbers preset for the program 201 to the authentication algorithm 202. Thereafter, the user system 210 compares the authentication key 203 received from the developer system 200 with the additional authentication key 204 created by the user system 210. If the authentication key 203 received from the developer system 200 is matched with the additional authentication key 204 created by the user system 210 according to the comparison result, the user system 210 uses the program 201.

In this case, according to the present embodiment, the user system 210 periodically requests the developer system 200 to transfer the authentication key 203 corresponding to the program 201 during the using of the program 201. In response to the request of the user system 210, the developer system 200 periodically transfers the authentication key 203 to the user system 210. In addition, if the authentication key 203 is received from the developer system 200, the user system 210 compares the authentication key 203 received from the developer system 200 with the additional authentication key 204 created by the user system 210. If the authentication key 203 received from the developer system 200 is matched with the additional authentication key 204 created by the user system 210 according to the comparison result, the user system 210 continuously uses the program 201. On the contrary, if the authentication key 203 received from the developer system 200 is not matched with the additional authentication key 204 created by the user system 210, the user system 210 stops the use of the program 201.

Figure 4:
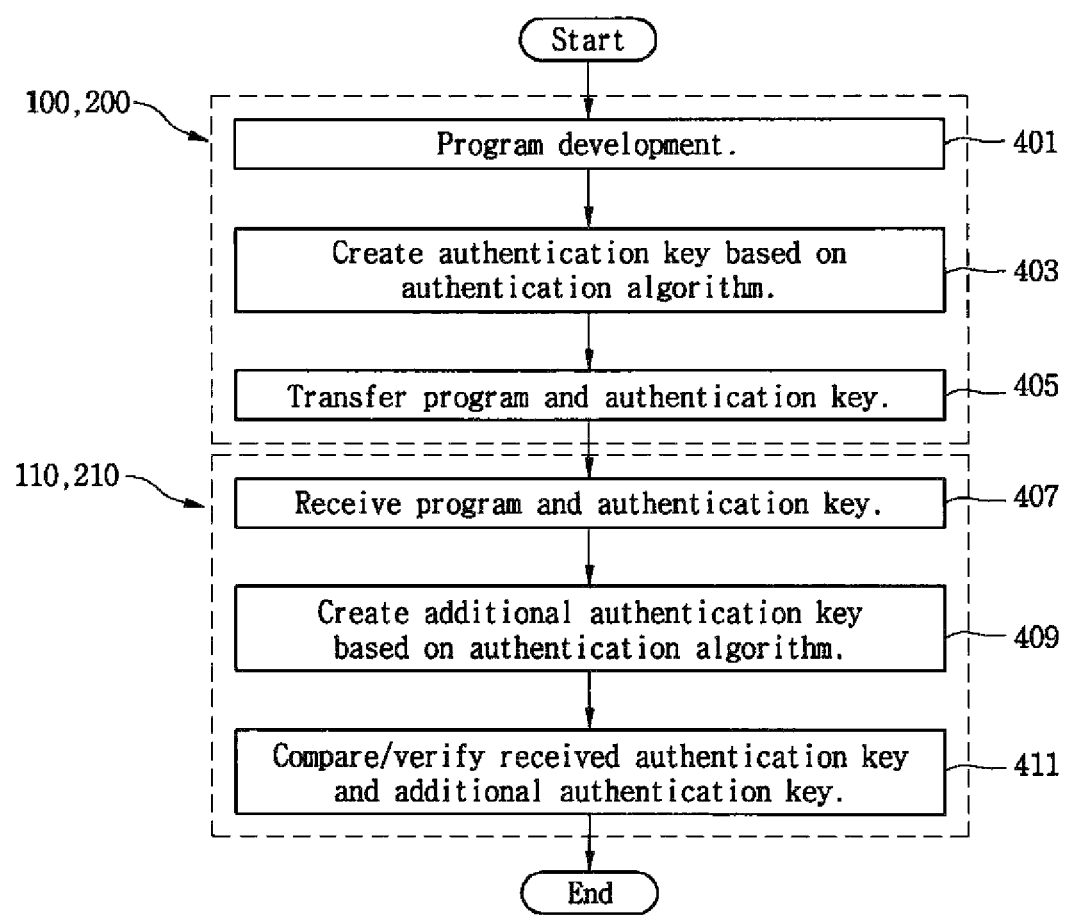
FIG. 4 is a flowchart showing an authentication procedure according to the embodiments of the present invention.

FIG. 4 is a flowchart showing an authentication procedure according to the embodiments of the present invention.

Referring to FIG. 4, the developer system 100 or 200 develops the program 101 or 201 in step S401. In this case, the developer system 100 or 200 stores the program 101 or 201. In addition, the developer system 100 or 200 creates the authentication key 103 or 203 by applying the authentication algorithm 102 or 202 to the program 101 or 201 in step S403. In this case, the authentication algorithm 102 or 202 may be a HASH algorithm. For example, the authentication algorithm 102 or 202 may include an MD4 HASH algorithm and an MD5 HASH algorithm. In addition, the developer system 100 or 200 transfers the program 101 or 201 and the authentication key 103 or 203 to the user system 110 or 210. In detail, the developer system 100 or 200 transfers the program 101 or 201 and the authentication key 103 or 203 to the user system 110 or 210 through the preset interface 105 or 205 in step S405. In this case, the interface 105 or 205 may be an API.

Thereafter, the user system 110 or 210 receives the program 101 or 201 and the authentication key 103 or 203 from the developer system 100 or 200 in step S407. In this case, the user system 110 or 210 stores the program 101 or 201 and the authentication key 103 and 203. Then, the user system 110 or 210 creates the additional authentication key 104 or 204 by applying the authentication algorithm 102 or 202 to the program 101 or 201 in step S409. Thereafter, the user system 110 or 210 compares the authentication key 103 or 203 received from the developer system 100 or 200 with the additional authentication key 104 or 204 created by the user system 110 or 210 to use the program 101 or 201 in step S411. In other words, if the authentication key 103 or 203 received from the developer system 100 or 200 is matched with the additional authentication key 104 or 204 created by the user system 110 or 210, the user system 110 or 210 uses the program 101 or 201.

Additionally, according to another embodiment of the present invention, the user system 210 periodically requests the developer system 200 to transfer the authentication key 203 corresponding to the program 201 during the using of the program 201. In response to the request of the user system 210, the developer system 200 periodically transfers the authentication key 203 to the user system 210. In addition, if the authentication key 203 is received from the developer system 200, the user system 210 compares the authentication key 203 received from the developer system 200 with the additional authentication key 204 created by the user system 210. If the authentication key 203 received from the developer system 200 is matched with the additional authentication key 204 created by the user system 210 according to the comparison result, the user system 210 continuously uses the program 201. On the contrary, if the authentication key 203 received from the developer system 200 is not matched with the additional authentication key 204 created by the user system 210, the user system 210 stops the use of the program 201.

The technical spirit of the present embodiment is not limited to the above-described embodiment and accompanying drawings, but must be interpreted based on attached claims.

Accordingly, various substitutes, changes and modifications can be obviously made by one ordinary skilled in the art within the spirit and scope of the present invention as hereinafter claimed.

The invention claimed is:

1. A system for authenticating a program, the system comprising:
   a developer system to develop the program, create an authentication key by applying a preset authentication algorithm to the program, and transfer the program together with the authentication key to a user system; and
   the user system to receive the program and the authentication key, create an additional authentication key by applying the preset authentication algorithm to the received program, compare the authentication key received form the developer system with the additional authentication key created by the user system, if the authentication key is received from the developer system, and use the received program if the received authentication key matches the additional authentication key,
   wherein the user system periodically requests the developer system to transfer the authentication key corresponding to the program during the using of the program; and
   wherein in response to the request of the user system, the developer system periodically transfers the authentication key to the user system.

2. The system of claim 1, wherein the preset authentication algorithm is shared between the user system and the developer system.

3. The system of claim 2, wherein the developer system and the user system create the authentication key by applying the preset authentication algorithm to the developed program and the developer system transfers the authentication key to the user system.

4. The system of claim 1, wherein the user system stops the using of the received program if the received authentication key does not match the additional authentication key.

\* \* \* \* \*